(12) United States Patent
Petersen

(10) Patent No.: US 6,361,304 B1
(45) Date of Patent: Mar. 26, 2002

(54) ADJUSTABLE CLAMP FRAME FOR A THERMO-FORMING MACHINE

(76) Inventor: Albert O. Petersen, 1120 Shaw Rd., Gladwin, MI (US) 48624

( * ) Notice: Subject to any disclaimer, the term of this patent is extended or adjusted under 35 U.S.C. 154(b) by 0 days.

(21) Appl. No.: 09/443,854

(22) Filed: Nov. 19, 1999

(51) Int. Cl.[7] .............................................. B29C 51/26
(52) U.S. Cl. ....................... 425/193; 425/384; 425/397; 425/DIG. 48; 269/114; 269/119; 269/140; 269/237
(58) Field of Search ................................. 425/384, 397, 425/451.9, DIG. 48, 193; 269/111, 114, 118, 119, 140, 237

(56) References Cited

U.S. PATENT DOCUMENTS

| | | | | |
|---|---|---|---|---|
| 2,907,069 | A | * 10/1959 | Butzko | 269/25 |
| 3,287,765 | A | * 11/1966 | Puente | 269/237 |
| 3,914,103 | A | * 10/1975 | Dean et al. | 425/397 |
| 4,018,551 | A | 4/1977 | Shuman | 425/388 |
| 4,097,035 | A | 6/1978 | Shuman | 269/121 |
| 4,099,901 | A | 7/1978 | Shuman | 425/388 |
| 4,170,449 | A | 10/1979 | Shuman | 425/445 |
| 4,938,678 | A | 7/1990 | Oulman | 425/397 |
| 5,562,933 | A | 10/1996 | Shuman | 425/388 |

* cited by examiner

*Primary Examiner*—Nam Nguyen
*Assistant Examiner*—Donald Heckenberg
(74) *Attorney, Agent, or Firm*—Bliss McGlynn & Nolan, PC

(57) ABSTRACT

An adjustable clamp frame for securing a work piece in a thermo-forming machine includes a pair of opposed, transverse cross members, each of which are adjustable along a continuum toward and away from one another. Each transverse cross member includes at least one clamping member for securing a work piece to the frame by clamping the respective edges thereof. The clamp frame also includes a pair of opposed, longitudinal cross members, each of which are adjustable along a continuum toward and away from one another. Each longitudinal cross member includes at least one clamping member for securing a work piece to the frame by clamping the respective edges thereof. The clamping members for each of the respective pair of opposed transverse and longitudinal cross members are adapted to be disposed on a common plane when the workpiece is secured in said frame. At least one of the pair of transverse and longitudinal cross members are movable such that the associated clamping members of the respective cross members are spaced from the common plane allowing for movement of the transverse and longitudinal cross members toward and away from on another along a full continuum defined by the clamp frame when the position of the cross members is adjusted.

38 Claims, 9 Drawing Sheets

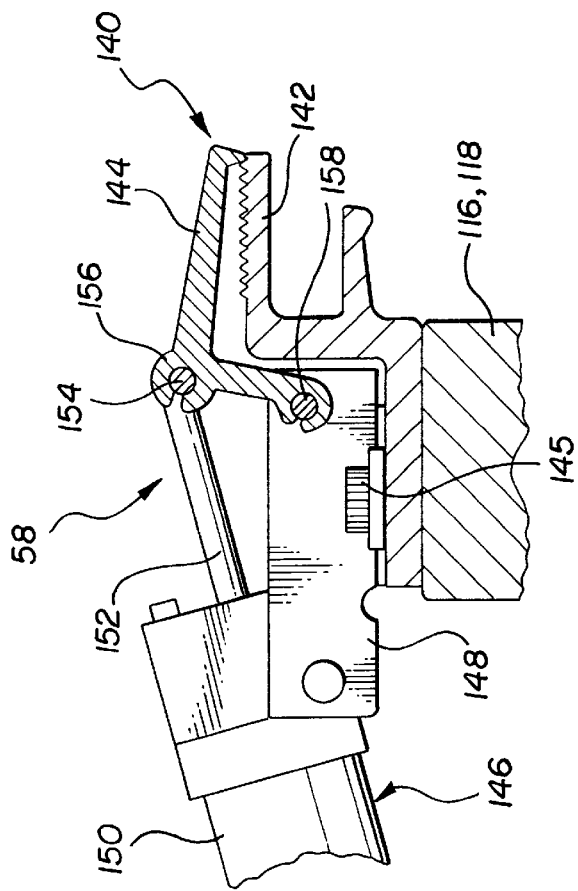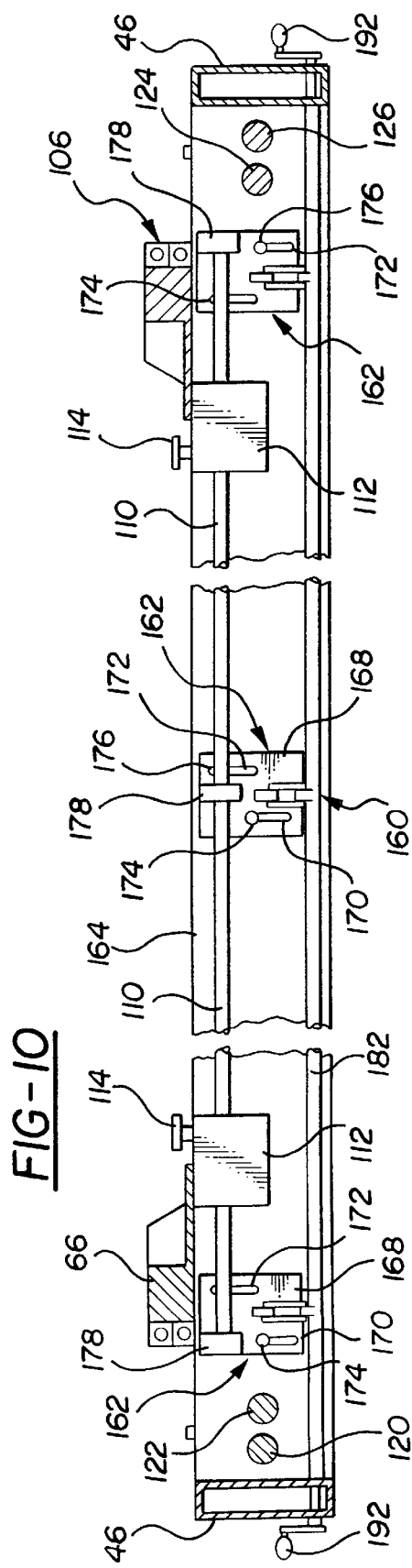

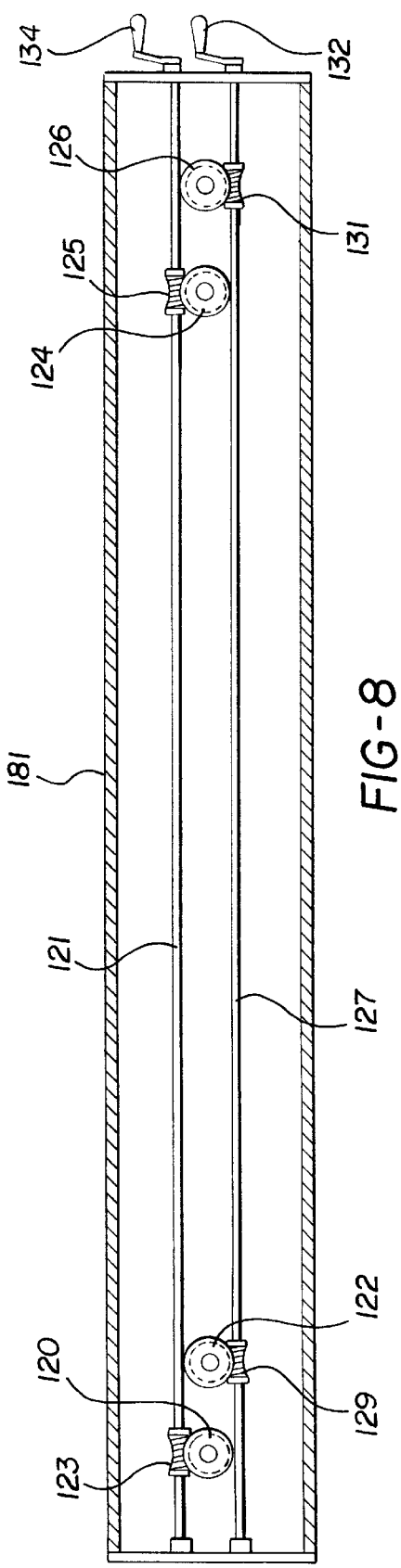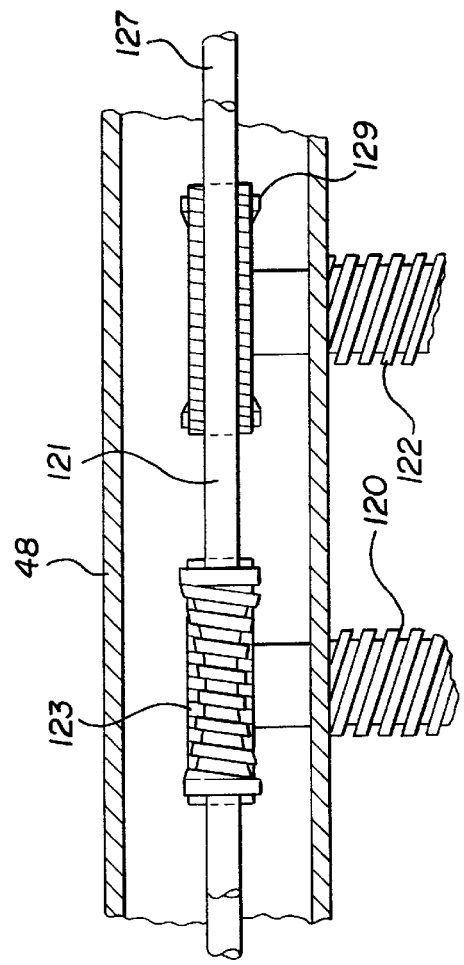

ADJUSTABLE CLAMP FRAME FOR A THERMO-FORMING MACHINE

BACKGROUND OF THE INVENTION

1. Field of the Invention

The present invention relates, generally, to thermo-forming machines, and more specifically, to adjustable clamp frames used to secure work pieces, such as plastic sheets of varying sizes, as the work pieces are cycled between stages within the machine wherein they are alternately heated and then formed to a particular shape defined by a mold.

2. Description of the Related Art

Thermo-forming machines are used in the manufacture of contoured plastic articles and the like. Machines of this type typically include a source of heat, such as an infrared or convection oven, and a mold. Thus, the ovens may be either gas fired or electric. A plastic, sheet-like work piece is cycled between the oven, where it is heated until it has become plasticized, and the mold where the work piece is formed into a desired shape. The mold may include at least one die and a pre-draw box, pressure plate or match tooling. The mold may thus be vacuum actuated, use air assisted pressure or simple mechanical force, as with match tooling, to form the plastic part. In the case of vacuum actuated molds, the die usually has a perforated surface. A vacuum is applied to this surface through the perforations which draws the heated sheet into contact with the surface of the die thereby imparting the shape of the die to the work piece. The newly formed plastic article is allowed to cool and is removed from the machine. The process is then repeated.

A clamp frame is typically used to secure the sheet-like workpiece in the machine, advance the work piece into the oven until it has become sufficiently plasticized and then to position the heated work piece adjacent the perforated die for molding. Clamp frames typically include a pair of opposed longitudinal frame members as well as a pair of opposed transverse frame members. Each frame member may include one or more clamps used to fix the workpiece relative to the machine.

In the past, it was known to use different sized clamp frames to accommodate workpieces of varying sizes. In this case, the clamp frames had to be changed when the dimension of the plastic sheet to be formed varied by more than one half inch. This was usually done immediately after a job run had been completed and usually while the frames were still relatively hot. It was found that this required considerable, undesirable work and time to remove the hot frame and install a new one for the next job. More specifically, this effort required disconnecting air lines, removing transverse frame members and loosening longitudinal frame members. The longitudinal frame members were then moved toward or away from each other to accommodate the size of the new plastic sheet workpiece. Transverse frame members which matched the size of the new workpiece were then installed on the frame, all fasteners were tightened and air lines reconnected. The operator was thus required to maintain a number of transverse frame members on hand to accommodate the varying dimensions of the workpiece formed by the thermo-forming machine. Obviously, this process was not consistent with modern manufacturing principles that require quick tool changes, reduced downtime for the machine and profitable short runs which minimize material and finished product inventories.

Accordingly, it became known in the art to employ transverse frame members which were large enough to accommodate movement of the longitudinal frame members outwardly to the maximum distance allowed by a particular clamp frame and which were also adjustable in finite, predetermined increments toward and away from one another. While this was an improvement over earlier practices, problems still remained. Any given clamp frame was still limited by the incremental adjustable distance of the transverse frame member toward and away from one another such that only specific changes in the dimensions of the workpiece could be accommodated. In addition, the relative movement of the transverse and longitudinally extending frame members sometimes caused interference between clamps on adjacent frame members.

Thereafter, clamp frames having opposed longitudinal and transverse frame members which were infinitely adjustable relative to one another became known in the art thereby solving the problem associated with incrementally adjustable frame members mentioned above. However, the devices proposed in the related art are rather mechanically complex or otherwise not cost-effective and thus have not been commercially adopted to any significant extent. Furthermore, the problems associated with confronting clamps on adjacent frame members still remain.

In response to this persistent problem, it became known in the art to position the clamps on the longitudinal and transverse frame members so that they were offset, above or below, an adjacent clamp. Unfortunately, this has not always eliminated interference between clamps during adjustment and also resulted in that the edges of the workpiece were clamped on different planes causing unacceptable distortion of the workpiece prior to and even after forming the plastic article.

Thus, there remains a need in the art for a clamp frame having transverse and longitudinal frame members which are adjustable toward and away from one another along a continuum and wherein the clamps employed with the frame members fix the edges of the workpiece on a common plane. In addition, there is a need in the art for such a clamp frame wherein the clamps located on adjacent transverse and longitudinal frame members do not confront one another or otherwise interfere with each other while the frame members are being adjusted. Still further, there is a need in the art for such a clamp frame which is easy to manufacture, simple to operate and which may be competitively priced.

SUMMARY OF THE INVENTION

The present invention overcomes the deficiencies of the related art in an adjustable clamp frame for securing a workpiece in a thermo-forming machine. The clamp frame of the present invention includes a pair of opposed, transverse cross members, each of which are adjustable along a continuum toward and away from one another. Each transverse cross member includes at least one clamping member for securing a work piece to the frame by clamping the respective edges thereof. The clamp frame also includes a pair of opposed, longitudinal cross members, each of which are adjustable along a continuum toward and away from one another. Each longitudinal cross member includes at least one clamping member for securing a work piece to the frame by clamping the respective edges thereof. The clamping members for each of the respective pair of opposed transverse and longitudinal cross members are adapted to be disposed on a common plane when the workpiece is secured in the frame. At least one of the pair of transverse and longitudinal cross members are movable such that the associated clamping members of the respective cross members are spaced from the common plane allowing for movement of the transverse and longitudinal cross members toward and away from one another along a full continuum defined by the clamp frame when the position of the cross members is adjusted.

One advantage of the present invention is that it provides a clamp frame for securing a workpiece in a thermo-forming machine with the clamp frame having opposed transverse and longitudinal frame members which are adjustable toward and away from one another along a continuum. Another advantage of the present invention is that the clamps employed on the opposed transverse and longitudinal frame members are adapted to be disposed on a common plane such that there is no distortion of the edges of the workpiece during the forming process.

Still another advantage of the present invention is that at least one of the pair of transverse and longitudinal frame members are movable such that their associated clamps are spaced from the common plane allowing or relative movement of the transverse and longitudinal frame members toward and away from one another along a full continuum defined by the clamp frame without interference or confronting contact between the clamps.

Other objects, features and advantages of the present invention will be readily appreciated as the same becomes better understood after reading the subsequent description taken in connection with the accompanying drawings.

BRIEF DESCRIPTION OF THE DRAWINGS

FIG. 6 is a cross-sectional side view of a clamping member mounted to a transverse cross member of the clamp frame of the present invention;

FIG. 8 is a cross-sectional side view taken through one of the lateral side members of the clamp frame and illustrating the relationship between the drive shafts, worm gearing and the lead screws of the clamp frame of the present invention;

FIG. 9 is a partial cross-sectional top view taken through one of the lateral side members and illustrating the relationship between one of the hand cranks, the lead screws, and the drive shafts and worm gearing of the clamp frame of the present invention;

FIG. 10 is a partial cross-sectional side view of the clamp frame of the present invention illustrating the lifting mechanism;

DETAILED DESCRIPTION OF THE PREFERRED EMBODIMENTS

Figure 1:
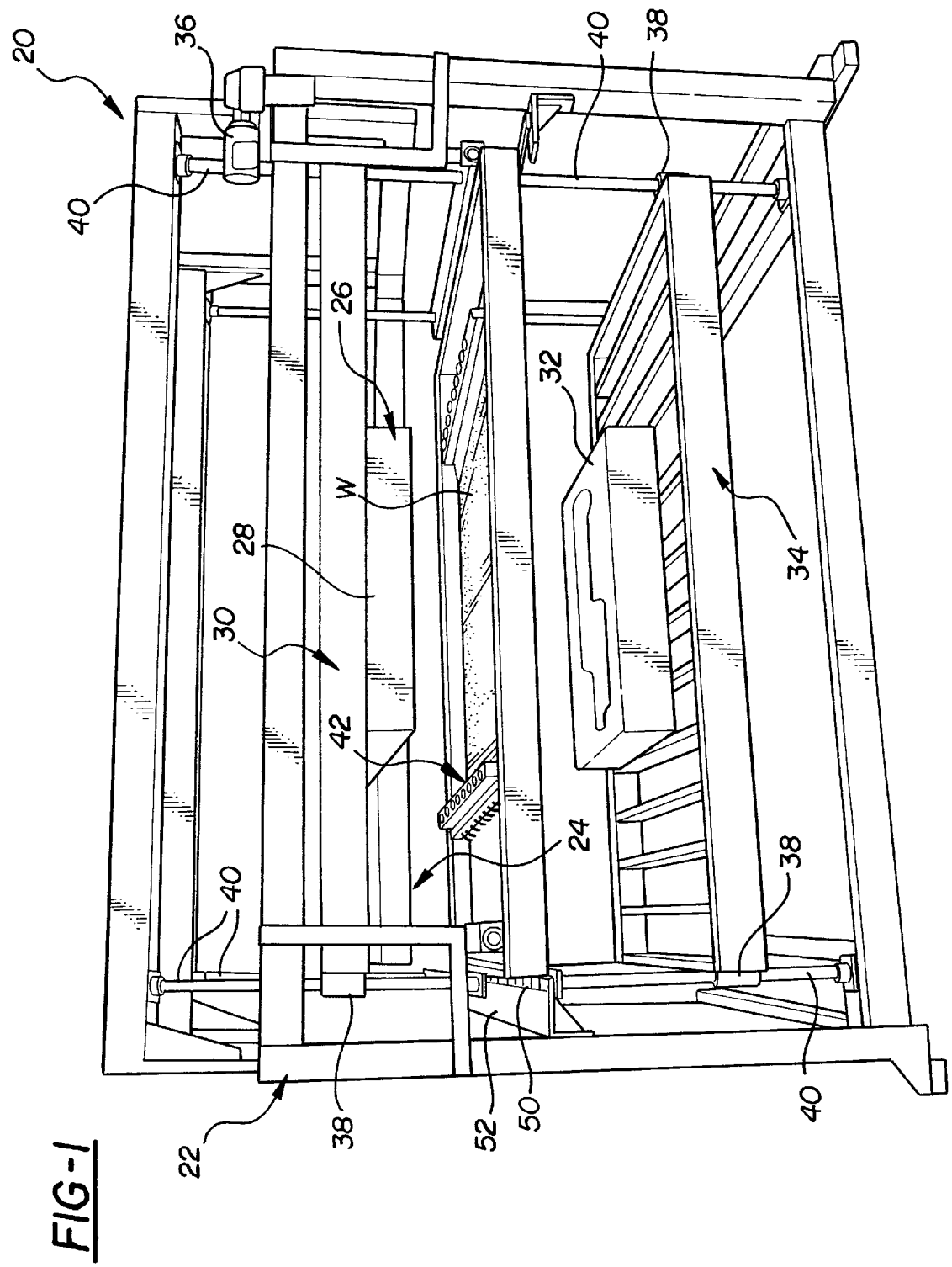
FIG. 1 is an end view of a thermo-forming machine of the present invention.

A thermo-forming machine of the present invention is generally indicated at 20 in FIG. 1. The thermo-forming machine 20 is conventional in many respects in that it includes a main superstructure, generally indicated at 22, which supports a source of heat, such as a convection or infrared oven, generally indicated at 24, and a mold assembly, generally indicated at 26. Thus, the oven may be gas-fired, electric or may use any other suitable source of heat. The thermo-forming machine 20 illustrated in this figure has a double-ended, shuttle-type configuration, one end of which is featured in FIG. 1. However, those having ordinary skill in the art will appreciate that the machine may have a turntable with multiple stations, a single station or any other type of configuration known in the art without departing from the scope of the present invention.

A plastic, sheet workpiece is cycled between the oven 24, where it is heated until it has become plasticized, and the mold assembly 26 where the workpiece is formed into a desired shape. The mold assembly 26 may include any combination of elements capable of imparting a shape to the plasticized workpiece. Thus, the mold assembly 26 may include a die, pre-draw box, pressure plate or match tooling. The mold assembly 26 may also be vacuum actuated, use air assisted pressure, or in the case of match tooling, use simple mechanical force. In the preferred embodiment, the mold assembly 26 is vacuum actuated and employs an upper die 28 mounted to an upper platen, generally indicated at 30. A lower mold member 32 is mounted to the lower platen, generally indicated at 34.

In the embodiment illustrated in FIG. 1, the upper and lower platens 30, 34, are substantially rectangular in shape with a gear housing 38 located at each corner of the platens 30, 34. Each gear housing 38 encloses one or more gears (not shown) which are in meshing engagement with four corresponding, upstanding racks 40 extending through the gear housings 38 at each corner of the upper and lower platens 30, 34. The upper and lower platens 30, 34, are vertically movable as illustrated in FIG. 1 toward and away from one another via the gears meshing with the upstanding racks 40 to bring the upper die 28 and lower mold member 32 into abutting contact with a workpiece W disposed therebetween as will be described in greater detail below. Movement of the platens 30, 34 may be effected manually or, as disclosed in the preferred embodiment, via an actuator such as an electric motor 36 shown mounted to the super structure 22 of the thermo-forming machine near the upper right hand corner thereof as depicted in FIG. 1.

The thermo-forming machine 20 also includes a clamp frame, generally indicated at 42, which secures the workpiece in a predetermined orientation relative to the oven 24 and mold assembly 26. Furthermore, the clamp frame 42 is indexable so as to position the workpiece opposite the oven 24, thereby heating it until plasticized. The clamp frame 42 is also indexable to position the plasticized workpiece between the upper die 28 and lower mold member 32. The die 28 and mold member 32 are brought into mating engagement as the upper and lower platens 30,34 are moved toward one another thereby imparting a contoured shape to the workpiece W. At the same time, and in the case of a vacuum-actuated die, the workpiece W is drawn toward the surface of the die. The newly formed part is allowed to "set up" or cool, the part is removed from the machine and the process is repeated.

Figure 2:
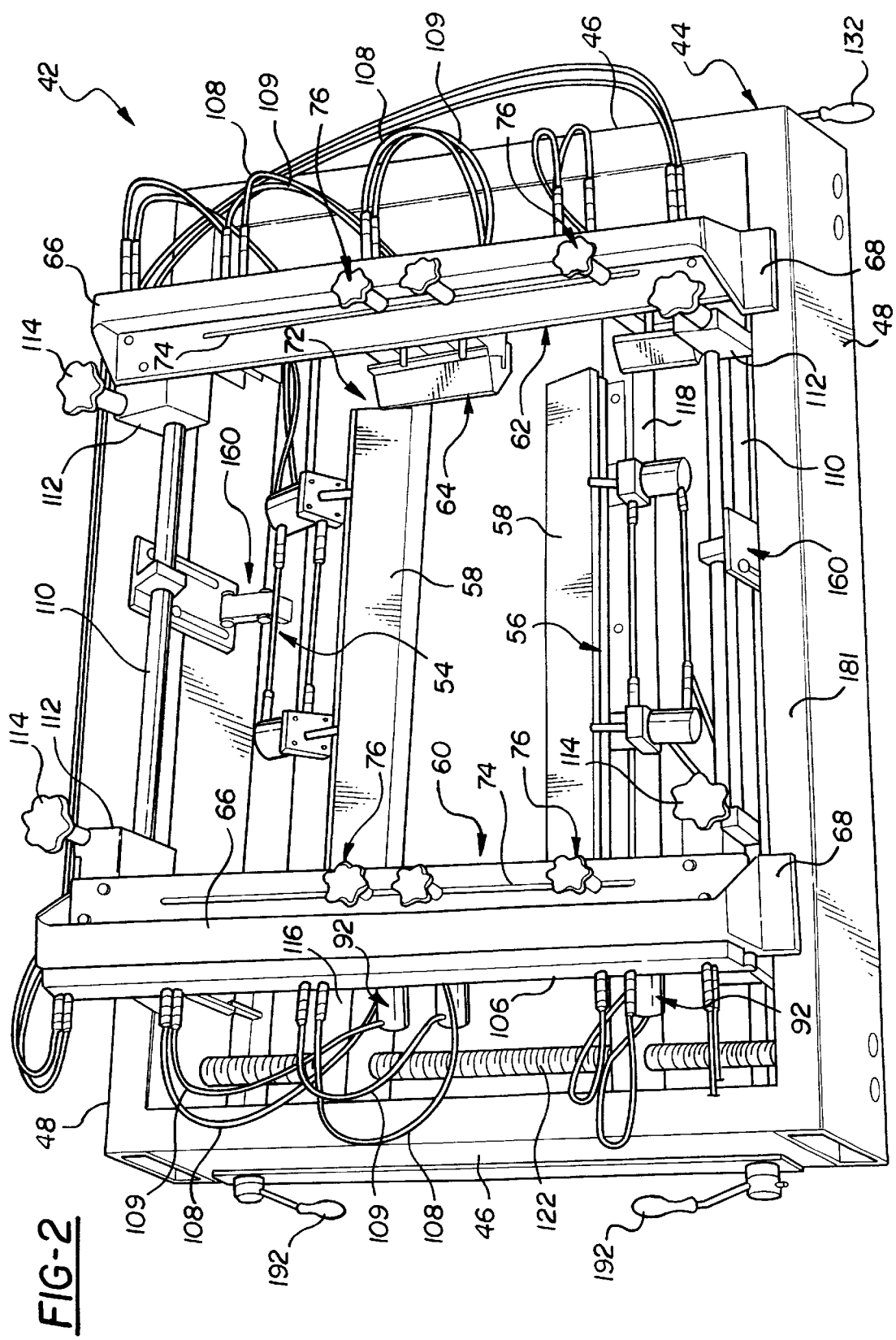
FIG. 2 is a perspective, elevational view of the clamp frame of the present invention.

To this end, the clamp frame 42 includes a main carriage, generally indicated at 44 in FIG. 2. In the preferred embodiment illustrated in these figures, the main carriage 44 is substantially rectangular in shape and is formed by a pair of opposed, hollow, rectangular, longitudinal end members 46 which extend between a pair of hollow, rectangular, lateral side members 48 which, together, define the outer limits of the clamp frame 42. The main carriage 42 may include rollers 50 mounted to the longitudinal end members 46 which ride on shelves 52 presented at either side of the thermo-forming machine 20 (FIG. 1). The rollers 50 and shelves 52 facilitate the indexing motion of the main carriage 44 relative to the oven 24 and mold assembly 26. Furthermore, those having ordinary skill in the art will appreciate that pinions may be substituted for the rollers 50 and racks for the shelves 52 without departing from the scope of the invention. In addition, and most definitely in the case of a larger thermo-forming machine used to form workpieces of any significant size, it is likely that the indexing action of the main carriage 44 will be motorized.

Referring back to FIG. 2, the clamp frame 42 also includes a pair of opposed, transverse cross-members, generally indicated at 54 and 56, supported by the main carriage 44 for movement independent of one another. More specifically, each of the opposed, transverse cross-members 54, 56 are infinitely adjustable along a continuum defined by the outer extent of the main carriage 44 toward and away from one another. Each transverse cross-member 54, 56 includes at least one clamping member 58 for securing a workpiece W to the clamp frame 42 by clamping the respective edges thereof as will be explained in greater detail below.

The clamp frame 42 further includes a pair of opposed, longitudinal cross-members, generally indicated at 60, 62 which are also supported by the main carriage 44 for movement independent of one another. More specifically, each of the pair of opposed, longitudinal cross-members 60, 62 are infinitely adjustable along a continuum defined by the outer extent of the main carriage 44 toward and away from one another. Each longitudinal cross-member 60, 62 includes at least one clamping member, generally indicated at 64, for securing a workpiece W to the clamp frame 42 by clamping the respective edges thereof as will be explained in greater detail below.

Figure 3:
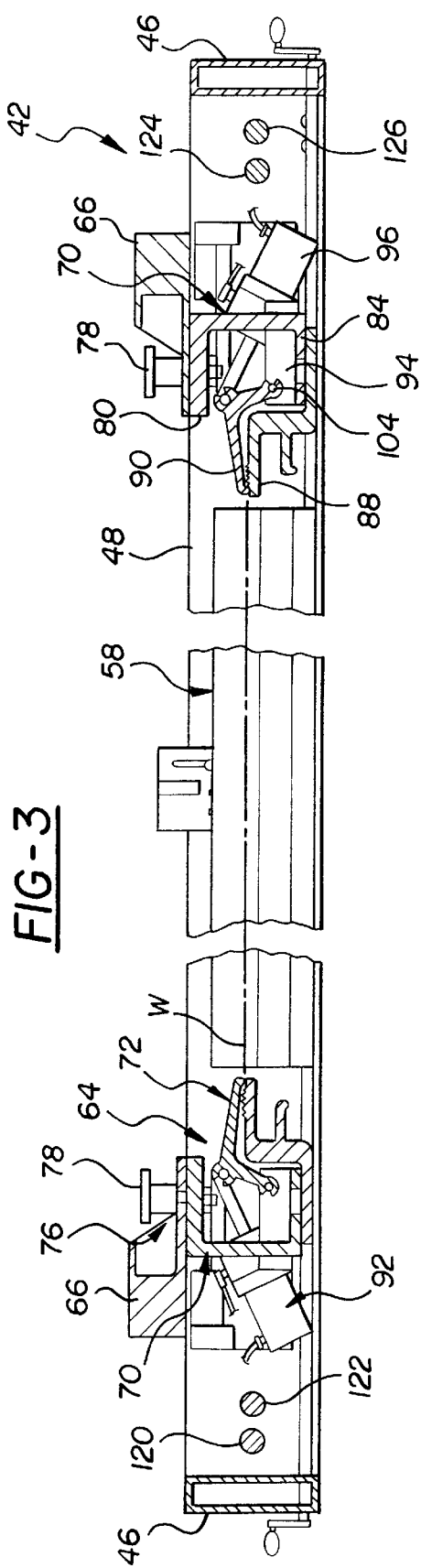
FIG. 3 is a cross-sectional side view of the clamp frame of the present invention.
Figure 4:
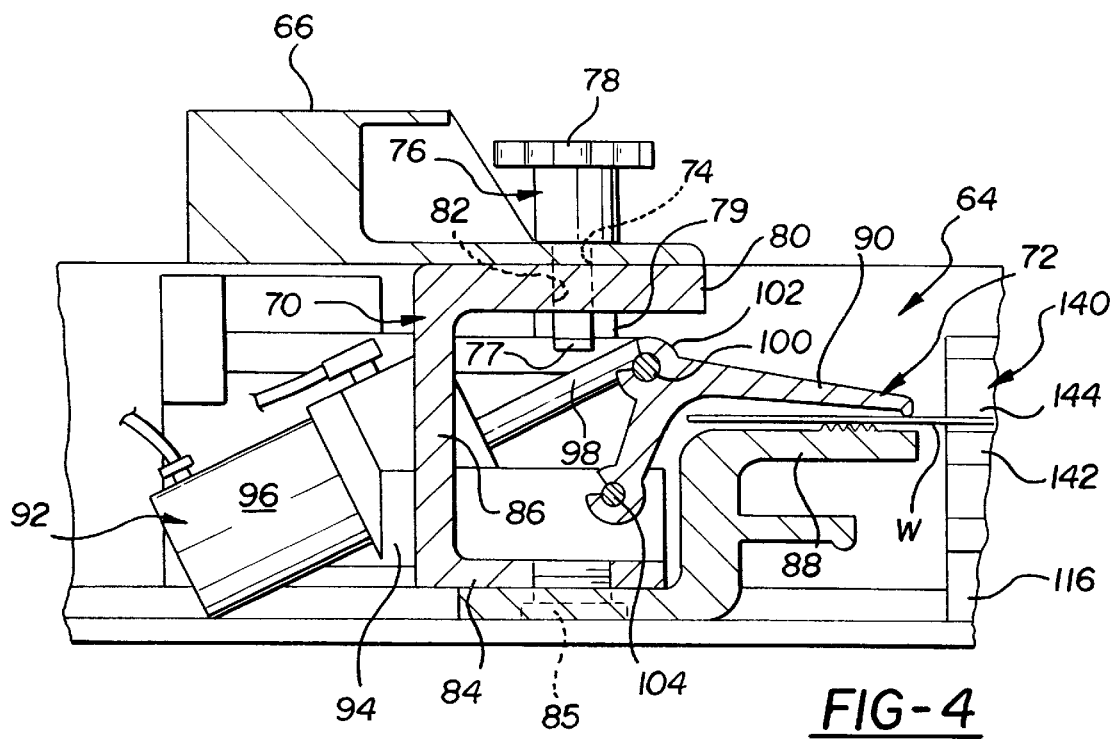
FIG. 4 is a partial, cross-sectional side view illustrating the clamping members mounted to the longitudinal cross-member of the present invention.

Each of the pair of opposed, longitudinal cross-members 60, 62 are identical and so the description which follows applies equally to both of the longitudinal cross-members 60, 62. More specifically, each of these cross-members 60, 62 includes a support beam 66 and at least one clamping member 64 movably supported by the beam 66 and infinitely adjustable on a continuum defined by the length of the beam 66 in the direction of the support beam 66. The support beam 66 includes a pair of ears 68 disposed at opposite, distal ends thereof for a purpose to be described later. As best shown in FIG. 3 and 4, the clamping members 64 on each of the support beams 66 includes a hanger, generally indicated at 70 and a clamp, generally indicated at 72 supported by the hanger 70. The support beams 66 include an elongated slot 74 (FIG. 2) extending for a substantial length of the cross-member 60, 62 with an adjustable fastening mechanism, generally indicated at 76, cooperatively interconnecting the hangers 70 and the support beams 66 to allow for selective movement of the clamps 72 relative to the support beams 66 in the direction of the elongated slot 74. Accordingly, and as best illustrated in FIG. 3 and 4, the adjustable fastening mechanisms 76 include a rotatable knob 78 which acts to clamp the hangers 70 relative to the support beams 66 at any position desired along the length of the slot 74. More specifically, a threaded shaft 77 cooperates with a nut 79 to fix the hanger 70 relative to the support beam 66.

Referring now specifically to FIG. 4, each of the hangers 70 is substantially C-shaped in cross-section and includes an upper flange 80 disposed in abutting relationship with the support beam 66. The hangers 70 include an aperture 82 which cooperates with the threaded shaft 77 of the fastening mechanism 76 through the elongated slot 74 to movably mount the hangers 70 to the support beam 66. Each hanger 70 also includes a lower flange 84 which supports the clamp 72 and a web portion 86 extending therebetween. Each of the clamps 72 includes a lower clamp member 88, an upper clamp member 90 and an actuator, generally indicated at 92. The lower clamp member 88 is supported by the lower flange 84 of the hanger 70 via a fastener 85 or the like. The actuator 92 is supported by a mounting bracket 94, which, in turn, is mounted to the lower flange 84 of the hanger 70. The actuator 92 is also operatively connected to the upper clamp member 90. In the preferred embodiment, the lower and upper clamp members 88, 90 are made of extruded aluminum bar stock and cut to length. The actuator 92 includes an air cylinder 96 and a piston rod 98 which operatively interconnects the air cylinder 96 and the upper clamp member 90 via connecting rod 100 and clevis 102. The upper clamp member 90 is pivotable about a pin 104 and relative to the lower clamp member 88 between its open and closed positions to selectively secure and release the edges of a workpiece W within the clamp frame 42.

Figure 4A:
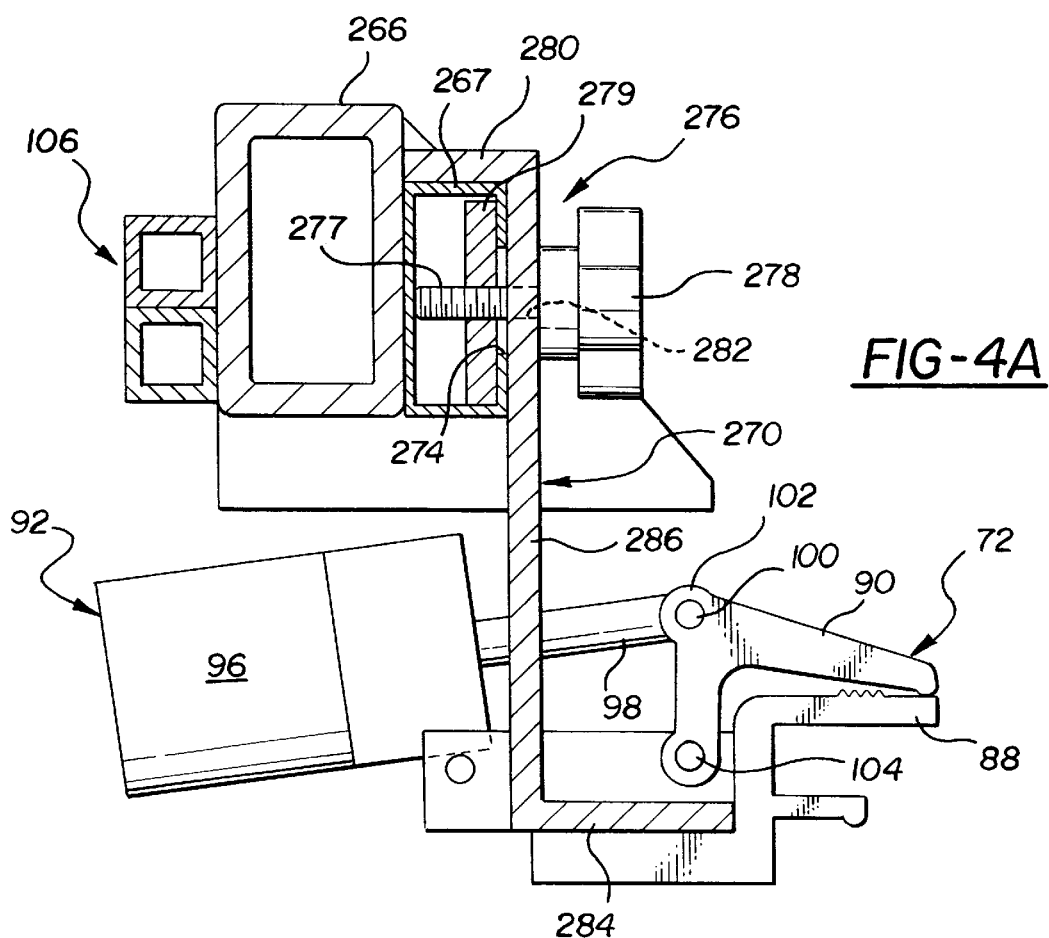
FIG. 4A is a cross-sectional side view illustrating an alternate embodiment of the hanger used to support the clamping members mounted to the longitudinal cross-member of the present invention.

Referring now to FIG. 4A, an alternate embodiment of the hanger is generally indicated at 270, wherein like numerals, some of which have been increased by a factor of 200, are used to designate like structure. As with the embodiment illustrated in FIG. 4A, the hanger 270 of the alternate embodiment also supports a clamp, generally indicated at 72. An adjustable fastener mechanism, generally indicated at 276, cooperatively interconnects the hangers 270 and the support beam 266 to allow for selective movement of the clamp 72 relative to the support beam 266 in the direction of an elongated slot 274. More specifically, the fastening mechanism 276 includes a knob 278 having a threaded shaft 277 which cooperates with a nut 279 to fix the hanger 270 relative to the support beam 266. However, and unlike the first embodiment, the elongated slot 274 is formed along a side wall of the support beam 266, rather than at the top of the support beam as illustrated in FIG. 4A.

Similarly, rather than C-shaped, each of the hangers 270 define a backward "S" n cross-section and includes an upper flange 280 disposed in abutting relationship with top portion 267 of the support beam 266. Each hanger 270 also includes a lower flange 284 which supports the clamp 72 and a web portion 286 extending therebetween. An aperture 282 extending through the web portion 286 cooperates with the shaft 277 of the fastening mechanism 276 through the elongated slot 274 to moveably mount the hangers 270 to the support beam 266. Like the earlier embodiment, each of the clamps 72 includes a lower clamp member 88, an upper clamp member 90 and an actuator, generally indicated at 92. The actuator 92 is supported by a mounting bracket 94 which, in turn, is mounted to the lower flange 284 of the hangers 270. The actuator 92 is also operatively connected to the upper clamp member 90. The actuator 92 includes an air cylinder 96 and a piston rod 98 which operatively interconnect the air cylinder 96 and the upper clamp member 90 via the connecting rod 100 and clevis 102. The upper clamp member 90 is pivotal about a pin 104 and relative to the lower clamp member 88 between its open and closed positions to selectively secure and release the edges of the workpiece W within the clamp frame 42.

Those having ordinary skill in the art will appreciate that the actuators 92 may be either pneumatically or hydraulically operated. However, in the preferred embodiment illustrated in these figures, the actuators 92 are pneumatically operated. Accordingly, the clamp frame 42 includes a manifold 106 (FIGS. 2 and 4A) which is operable to distribute pressurized air to the actuators 92 thereby opening and closing the clamps 72. More specifically, each of the longitudinal cross-members 60, 62 includes a manifold 106 extending for at least a portion of the length of the support beams 66, 266 and which is operable to distribute pressurized air to and from the actuators 92 via supply hoses 108 and 109.

Referring again to FIG. 2, the clamp frame 42 also includes a pair of guide shafts 110 which are longitudinally spaced relative to each other and supported by the clamp frame 42. The guide shafts 110 are preferably cylindrical and extend between the pair of opposed, longitudinal cross-members 60, 62. The cross-members 60, 62 include bearing members 112 interconnecting the support beams 66 and the guide shafts 110. The support beams 66, 266 are operatively supported by the guide shafts 110 and the bearing members 112 which facilitate smooth, linear motion of the support beams 66, 266 toward and away from one another. As illustrated in FIG. 2, the bearing members 112 may include manually actuated knobs 114 for fixing and releasing the position of the each of the longitudinal cross-members 60, 62 on the guide shafts 110 and relative to one another. However, those having ordinary skill in the art will appreciate that the bearing members may be automatically actuated.

Figure 7:
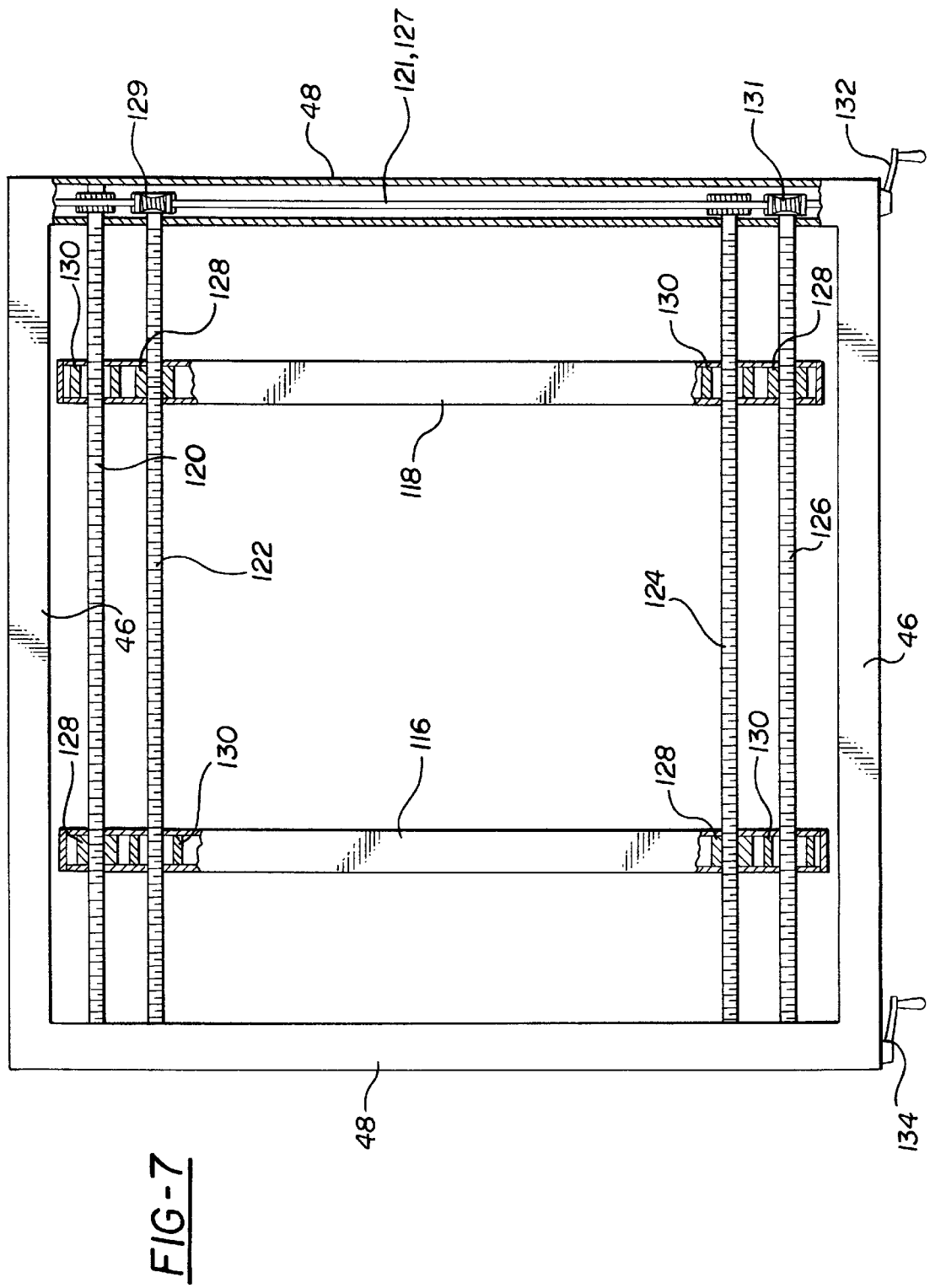
FIG. 7 is a bottom view of the clamp frame of the present invention illustrating the tubular members supported upon lead screws for movement toward and away from one another.
Figure 12:
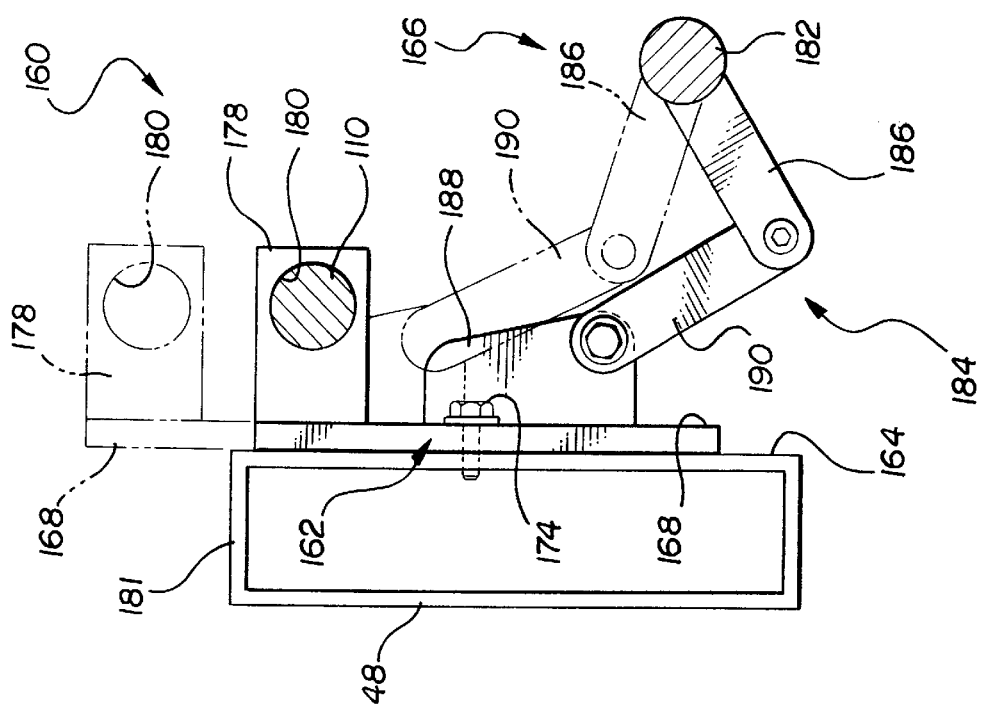
FIG. 12 is a cross-sectional side view of the slide guides and drive mechanism of the lifting mechanism of the present invention.
Figure 11:
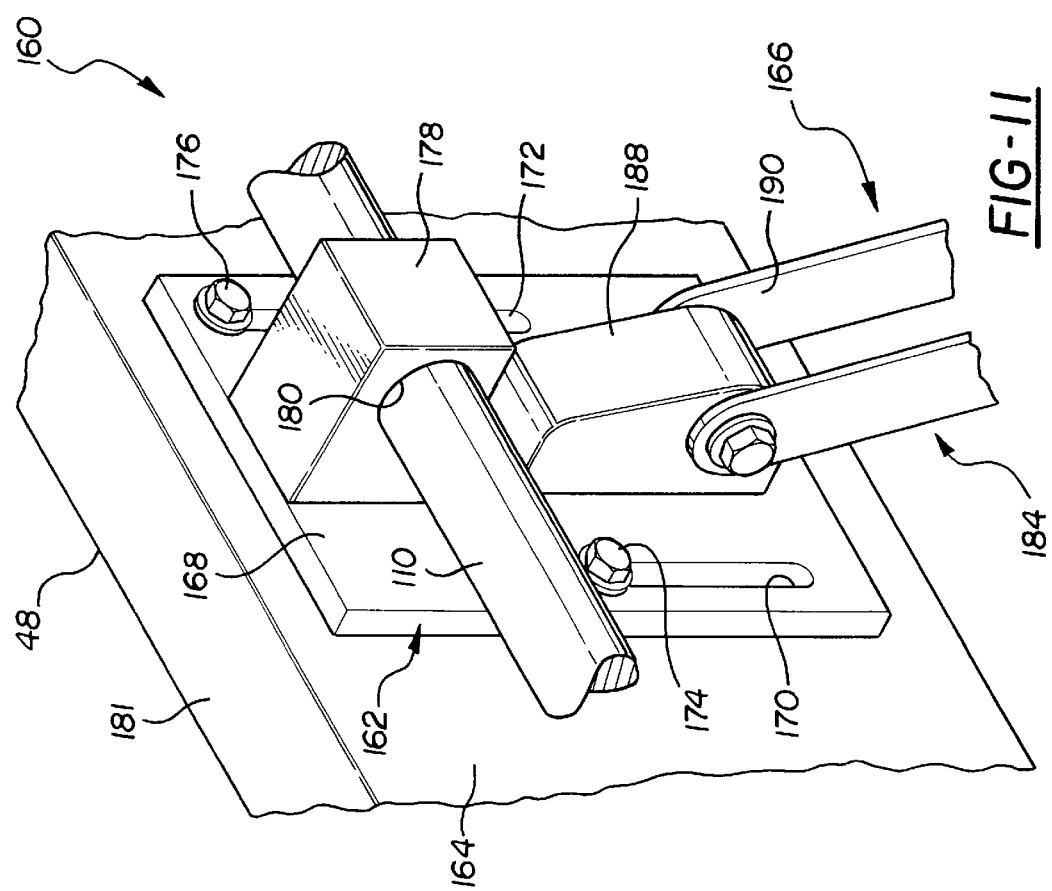
FIG. 11 is a partial perspective view of the slide guides and drive mechanism of the lifting mechanism of the present invention.

Referring now to FIGS. 2–3 and 5–7, each of the pair of opposed transverse cross-members 54, 56 includes a tubular segment 116, 118, respectively. A pair of lead screws 120, 122 and 124, 126, respectively, are located at each end of each transverse cross-members 54, 56 and extend across the clamp frame 42 substantially perpendicular to the transverse cross-members and thus substantially parallel to the longitudinal cross members 60, 62. Only the lead screw 122 is shown in the view illustrated in FIG. 2, but each of the lead screws 120–126 is shown in FIGS. 3 and 7. The lead screws 120,122, 124 and 126 extend through the tubular segments 116, 118. The tubular segment 116 includes a pair of nuts 128 disposed at either end thereof and corresponding to one pair 120, 124 of the lead screws. In addition, the tubular segment 116 includes a pair of bearings 130 disposed at either end thereof and corresponding to the other pair of lead screws 122, 126. On the other hand, the tubular segment 118 includes a pair of nuts 128 disposed at either end thereof and corresponding to one pair 122, 126 of the lead screws. Likewise, the tubular segment 118 includes a pair of bearings 130 disposed at opposite ends thereof and corresponding to the other pair of the lead screws 120, 124.

Rotation of the lead screws 120, 124 cause selective movement of the tubular segment 116 toward and away from the opposed tubular segment 118 via movement of the nuts 128 on the screws 120, 124. Similarly, rotation of the lead screws 122, 126 cause selective movement of the tubular segment 118 toward or away from the opposed tubular segment 116 via movement of the nuts 128 on the screws 122, 126. However, the screws 120, 122, 124, 126 are free to rotate relative to the bearings 130 carried by either tubular segment 116, 118 without imparting any movement thereto.

In the embodiment illustrated in FIG. 2, the lead screws 120, 124 are manually actuated via hand crank 134. Hand crank 134 is operatively connected to lead screw 124 and lead screw 120 via a worm gear train. More specifically and as best shown in FIGS. 7 through 9, a drive shaft 121 is supported within a hollow, lateral side member 48 and interconnects lead screws 120, 124 via a pair of worm gears 123, 125 mounted to the drive shaft 121. Worm gear 123 is in meshing engagement with the lead screw 120 and worm gear 125 is in meshing engagement with the lead screw 124. Rotation of the drive shaft 121 via hand crank 134 causes rotation of the lead screw 120 via the worm gear 123. Rotation of the drive shaft 121 also causes corresponding rotation of the lead screw 124 via the worm gear 125. Thus, the lead screws 120, 124 are operatively coupled together such that they rotate together and cause corresponding movement of the tubular segment 116 toward and away from the opposed tubular segment 118 as discussed above. Similarly, the lead screws 122, 126 are manually actuated via hand crank 132, supported on the main carriage 44. Hand crank 132 is operatively to lead screw 122 and lead screw 126 via a worm gear train. More specifically, a drive shaft 127 is also supported within the hollow, lateral side member 48 in spaced parallel relationship with respect to the drive shaft 121. The drive shaft 127 interconnects lead screws 122, 126 via a pair of worm gears 129, 131 mounted to the drive shaft 127. The worm gear 129 is in meshing engagement with the lead screw 122 and worm gear 131 is in meshing engagement with the lead screw 126. Rotation of the drive shaft 127 via the hand crank 132 causes rotation of the lead screw 122 via the worm gear 131. Rotation of the drive shaft 127 causes corresponding rotation of the lead screw 126 via the worm gear 129. Thus the lead screws 122 and 126 are operatively coupled together such that they rotate together and cause corresponding movement of the tubular segments 118 toward and away from the opposed tubular segment 116 as discussed above. However, those having ordinary skill in the art will appreciate that the lead screws 120, 122, 124 and 126 may be powered or otherwise automatically actuated to move the tubular segments 116, 118 and thus the transverse cross-members 54 and 56 toward and away from one another.

Figure 5:
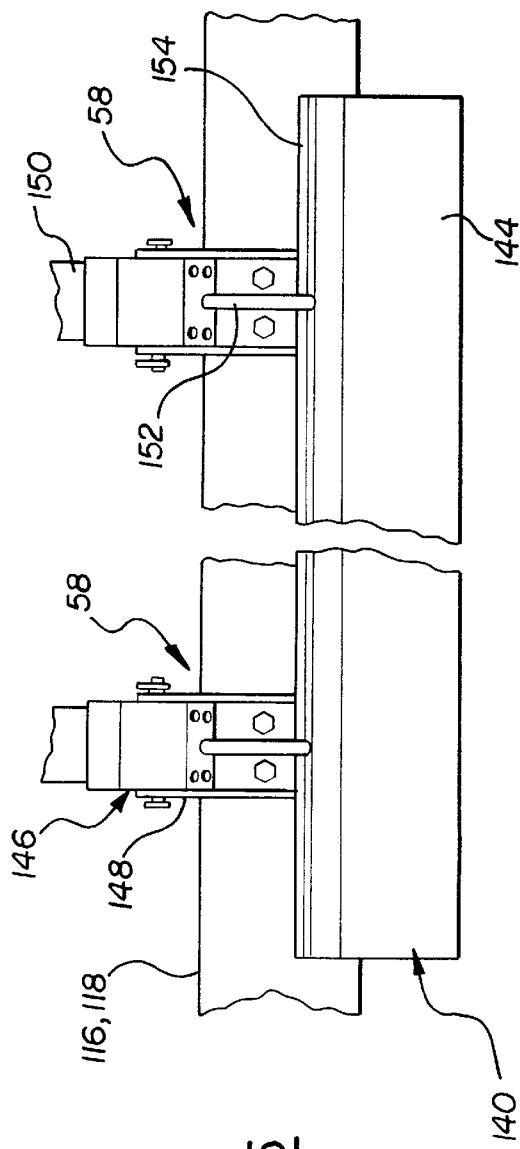
FIG. 5 is a partial top view of the clamping members mounted to a transverse cross member of the present invention.

As best shown in FIGS. 5 and 6, the clamping members 58 on the pair of opposed, transverse cross-members 54, 56 include a clamp 140 having a lower clamp member 142, an upper clamp member 144, and an actuator 146. The actuator 146 is supported by a mounting bracket 148 which, in turn, is mounted to the lower clamp member 142, and a tubular segment 116, 118 via a fastener 145 or the like. The actuator 146 is operatively connected to the upper clamp member 144. In the preferred embodiment, the upper and lower clamp members 144, 142 are made of extruded aluminum bar stock and cut to length. The actuator 146 includes an air cylinder 150 and a piston rod 152, operatively interconnecting the air cylinder 150 and the upper clamp member 144 via connecting rod 154 at clevis 156. The upper clamp member 144 pivots about point 158 relative to the lower clamp member 142 thereby opening and closing the actuator to selectively secure and release the edges of a workpiece W relative to the clamp frame 42.

As can be seen with reference to FIGS. 3 and 4, the clamping members 58, 64 for each of the respective pair of opposed transverse and longitudinal cross-members 54, 56, 60, 62 are adapted to be disposed on a common plane when the workpiece W is secured therein. This common plane is substantially defined by the planar workpiece W prior to molding. However, when the relative position of the transverse and longitudinal cross-members 54, 56, 60, 62 needs to be adjusted, it is possible for the clamping members 58, 64 to confront one another or otherwise interfere with adjustments. Accordingly, and to avoid this problem, at least one of the pair of transverse and longitudinal cross-members 54, 56, 60, and 62 is movable such that the associated clamp members 58, 64 of the respective cross-members are spaced from the common plane. This allows for movement of the transverse and longitudinal cross-members 54, 56, 60, 62 toward and away from one another along a full continuum defined by the clamp frame 42 when the position of the cross-members is adjusted and without confrontation or interference between adjacent clamping members 58, 64.

To this end, the clamp frame 42 of the present invention includes a lifting mechanism, generally indicated at 160 in FIGS. 2 and 10–14, which is operable to move at least one of the pair of transverse and longitudinal cross-members 54, 56, 60, 62, respectively, in a direction which is substantially perpendicular to the common plane such that the associated clamp members 58, 64 of the respective cross-members are no longer disposed on the common plane. More specifically, and as best illustrated in the preferred embodiment of FIGS. 10–14, the lifting mechanism 160 operates to move the longitudinal cross-members 60, 62 upwardly or vertically relative to the main carriage 44. However, those having ordinary skill in the art will appreciate that the lifting mechanism 160 may just as well act to move the transverse cross-member 54, 56 in the same manner or in another direction relative to the main carriage 44.

The lifting mechanism 160 includes a plurality of slide guides, generally indicated at 162, which are supported on the inner surface 164 of the lateral side members 48 of the main carriage 44. The slide guides 162 are operatively connected to the guide shafts 110. A drive mechanism, generally indicated at 166 in FIGS. 11–14, is connected to the slide guides 162 and is operable to move these slide guides 162 vertically relative to the main carriage 44. Vertical movement of the slide guides 162 causes movement of the support beams 66 and their associated clamping members 62 vertically, or in a direction perpendicular, toward and away from the common plane.

To this end, each of the slide guides 162 includes a plate 168 having a pair of slots 170, 172 which are disposed spaced from one another and offset in the direction of movement of the slide guides 162 relative to the main carriage 44. Each of the slots 170, 172 is adapted to receive a headed fastener 174, 176 mounted to the main carriage 44 so as to facilitate smooth, vertical movement of the slide guides 162 relative to the main carriage 44. The slide guides 162 further include a boss 178 mounted to the plate 168 and extending inwardly relative to the space defined by the clamp frame 42. Each boss 178 includes an aperture 180 through which the cylindrical guide shafts 110 pass and are supported as the pair of opposed, longitudinal cross-members 60, 62 are moved relative to the common plane. Thus, the respective ends of the slots 170, 172 define the limits of movement of the slide guides 162 relative to the main carriage 44. In addition, and when the opposed, longitudinal cross-members 60, 62 are located at their lowermost position wherein the clamping members 58, 64 are disposed at the common plane, the ears 68 of the support beams 66 rest upon the upper surface 181 of the lateral side members 48 of the main carriage 44.

The drive mechanism 166 includes a drive shaft 182 and a linkage, generally indicated at 184, interconnecting the drive shaft 182 and each of the plates 168 mounted to the inner surface 164 of the lateral side members 48. The drive shaft 182 acts to selectively raise and lower the pair of opposed, longitudinal cross-members 60, 62 relative to the main carriage 44 through the linkage 184, the slide guides 162 and guide shafts 110. The linkage 184 further includes arms 186 fixed to the drive shaft 182, a clevis 188 fixed to each of the plates 168 and a link 190 extending between each of the arms 186 and each of the clevises 188. Together, the arms 186, clevis' 188 and links 190 cooperate with the drive shaft 182 and each of the plates 168 to translate rotational movement of the drive shaft 182 through approximately 180–270 degrees into smooth, linear movement of the plate 168 as the pair of opposed, longitudinal cross-members 60, 62 are raised and lowered relative to the main carriage 44. Further, and while the drive mechanism 166 illustrated in these figures is manually actuated via hand cranks 192, those having ordinary skill in the art will appreciate that the drive mechanism may be powered or otherwise automatically actuated to raise and lower the longitudinal cross-members 60, 62.

OPERATION

Figure 13:
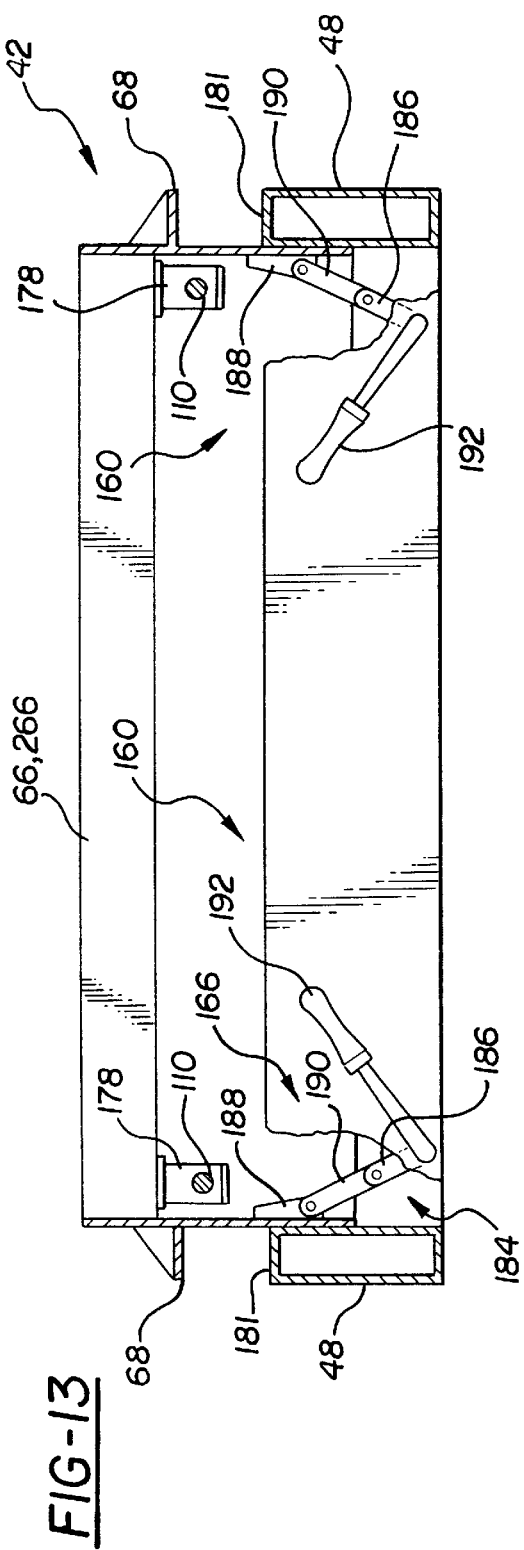
FIG. 13 is a cross-sectional side view of the clamp frame of the present invention illustrating the longitudinal cross-members disposed in their raised position.

At the start of a thermo-forming operation, the clamp frame 42 is initially indexed so that it is supported between the upper and lower platens 30, 34. The longitudinal cross-members 60, 62 are raised as illustrated in FIG. 13 by actuation of the lifting mechanism 160 so that the transverse and longitudinal cross-members 54,56,60, and 62 may be adjusted toward and away from one another along their respective continuum without their respective clamping members 58 and 64 confronting in any way. More specifically, the position of the longitudinal cross-members 60,62 may be adjusted as the support beams 66, 266 are moved toward and away from one another by adjustment of the bearing members 112 relative to the guide shafts 110. Similarly, the transverse cross-members 54, 56 are adjusted by actuation of the lead screws 120, 122, 124, 126 which adjust the position of the tubular members 116, 118 toward and away from one another. Once the transverse and longitudinal cross-members 54, 56, 60 and 62 are properly positioned to support a workpiece W of any given size, the clamping member 64 of the longitudinal cross-members 60, 62 are positioned as needed. More specifically, the clamps 72 may be adjusted to any position along the continuum defined by the elongated slot 74, 274 on a support beam 66 or 266. Further, and depending upon the size of the workpiece W, the clamps 72 may be selectively added or removed to the support beams 66, 266 to properly secure the workpiece, as needed.

Figure 14:
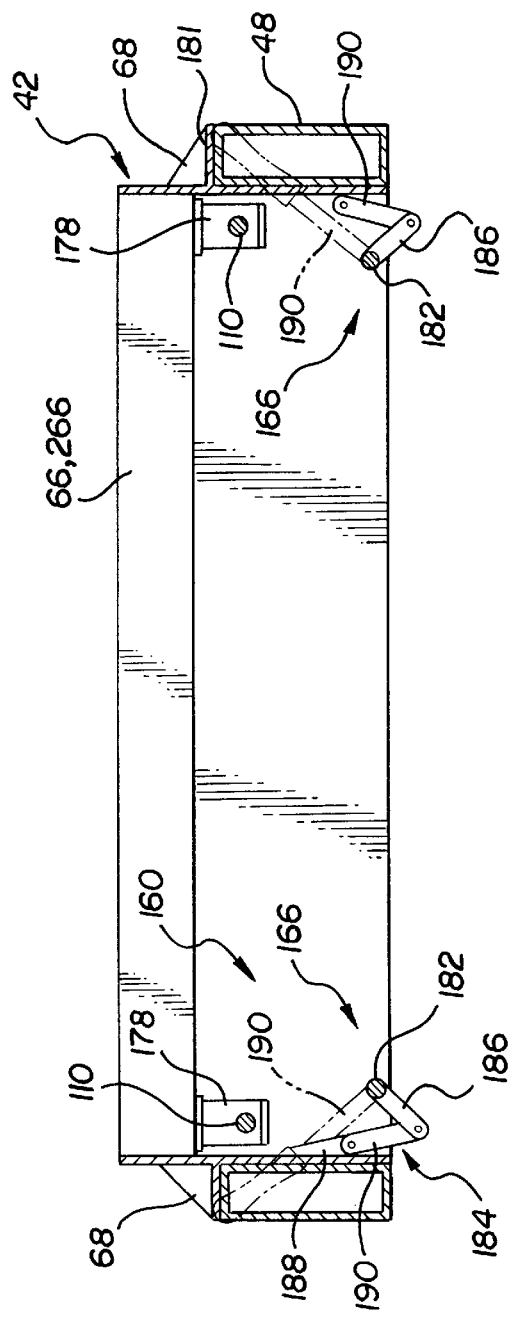
FIG. 14 is a cross-sectional side view of the clamp frame of the present invention illustrating the support beams of the longitudinal cross-members in their lowered position.

The lifting mechanism 160 is again actuated to lower the longitudinal cross-members 60, 62 to the disposition illustrated in FIGS. 2 and 14 and so that the adjustable clamping members 58 and 64 are all disposed on the same, common plane as illustrated, for example in FIGS. 3 and 4. In the case of an electronically controlled clamp frame 42, the relative positions of the transverse and longitudinal cross-members 54, 56, 60 and 62 are then stored in the memory of a controller, such as a microprocessor (not shown) to facilitate accuracy and repeatability for any given size workpiece W.

In this disposition, all of the clamps 72 and 140 are open such that the upper clamp members 90 and 144 are pivoted away from the lower clamp members 88 and 142, respectively. Thus, each lower clamp member 88 and 142 defines a ledge with each ledge disposed on a common plane.

The operator then places the workpiece W within the clamp frame 42 such that it rests on the ledges defined by the lower clamp members 88 and 142 and actuates the clamp members 64 and 58 such that the upper clamp members 90, 144, respectively, are pivoted toward the lower clamp members 88,142. In this way, the edges of the workpiece are gripped by the clamping members 64, 58 and fixed in the clamp frame 42.

The clamp frame 42 is then indexed so that the workpiece W is positioned opposite the oven 24 for a predetermined amount of time and until it has become sufficiently plasticized. Once the workpiece has become sufficiently plasticized, the clamp frame 42 is indexed so as to be positioned between the upper die 28 and the lower mold member 32. The die 28 and mold member 32 are brought into mating engagement as the upper and lower platens 30, 34 are moved toward one another thereby imparting a contoured shape to the workpiece W. At the same time, and in the case of a vacuum actuated die, the workpiece W is drawn toward the surface of the die. The newly formed part is allowed to "set up" or cool. The upper and lower platens 30, 34 are then moved away from one another, the part is removed from the machine and the process is repeated.

Thus, the present invention provides a clamp frame for securing a workpiece W in a thermo-forming machine with the clamp frame 42 having opposed transverse and longitudinal frame members 54, 56, 60, and 62 which are adjustable toward and away from one another along a continuum. Furthermore, the clamps 72, 140 employed on the opposed transverse and longitudinal frame members are adapted to be disposed on a common plane such that there is no distortion of the edges of the workpiece W during the forming process. In addition, at least one of the pair of transverse and longitudinal frame members, and in the preferred embodiment it is the pair of longitudinal frame members 60, 62, are movable such that their associated clamps 72 may be spaced from the common plane allowing for relative movement of the transverse and longitudinal frame members 54, 56, 60 and 62 toward and away from one another along a full continuum defined by the clamp frame 42 without interference or confronting contact between their respective clamping members 58 and 64.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

I claim:

1. A clamp frame for securing a work piece in a thermo-forming machine, said clamp frame comprising:
    a pair of opposed, transverse cross members each of which are infinitely adjustable along a continuum toward and away from one another, each transverse cross member including at least one clamping member for securing a work piece to said frame by clamping the respective edges thereof;
    a pair of opposed, longitudinal cross members each of which are infinitely adjustable along a continuum toward and away from one another, each longitudinal cross member including at least one clamping member for securing a work piece to said frame by clamping the respective edges thereof;
    said clamping members for each of said respective pair of opposed transverse and longitudinal cross members adapted to be disposed on a common plane when the workpiece is secured in said frame; and
    at least one of said pair of transverse and longitudinal cross members being movable such that the associated clamping members of the respective cross members are spaced from said common plane while the associated clamping members of the other respective cross members remain substantially in said common plane allowing for movement of said transverse and longitudinal cross members toward and away from one another along a full continuum defined by said clamp frame when the position of said cross members is adjusted.

2. A clamp frame as set forth in claim 1 further including a lifting mechanism which is operable to move at least one of said pair of transverse and longitudinal cross members in a direction substantially perpendicular to said common plane such that the associated clamping members of the respective cross members are no longer disposed on said common plane.

3. A clamp frame as set forth in claim 2 wherein said lifting mechanism is operable to move said longitudinal cross members in a direction perpendicular to and spaced from said common plane.

4. A clamp frame as set forth in claim 2 further including a main carriage which supports said pair of opposed transverse and longitudinal cross members for movement independent of one another.

5. A clamp frame as set forth in claim 4 wherein each of said pair of opposed, longitudinal cross members includes a support beam and at least one clamping member moveably supported by said support beam on a continuum in the direction of said support beam.

6. A clamp frame as set forth in claim 5 wherein said clamping members on each of said support beams includes a hanger moveably supported by said support beam on a continuum in the direction of said support beam and a clamp supported by said hanger.

7. A clamp frame as set forth in claim 6 wherein each of said support beams includes an elongated slot extending for a substantial length of said cross member with an adjustable fastening mechanism cooperatively interconnecting said hangers and said support beams to allow selective movement of said clamps relative to said support beams in the direction of said elongated slot.

8. A clamp frame as set forth in claim 7 wherein each of said hangers is substantially C-shaped in cross-section and includes an upper flange disposed in abutting relationship with said support beam and having an aperture which cooperates with said fastening mechanism through said elongated slot to mount said hanger to said support beam, a lower flange which supports said clamp and a web portion extending therebetween.

9. A clamp frame as set forth in claim 8 wherein said clamp includes a lower clamp extrusion, an upper clamp extrusion, and an actuator operatively connected to said upper clamp extrusion, said upper clamp extrusion being movable relative to said lower clamp extrusion under the influence of said actuator between open and closed positions to secure and release the edges of a work piece.

10. A clamp frame as set forth in claim 9 wherein said actuator includes a piston moveably supported in a cylinder, and a piston rod operatively interconnecting said piston and said upper clamp extrusion for moving said upper clamp extrusion relative to said lower clamp extrusion between its opened and closed positions.

11. A clamp frame as set forth in claim 9 further including a manifold operable to distribute pressurized air to said actuators to open and close said clamps.

12. A clamp frame as set forth in claim 11 wherein each said of longitudinal cross members includes a manifold extending for at least a portion of said support beams and operable to distribute pressurized air to said actuators.

13. A clamp frame as set forth in claim 5 further including a pair of opposed guide shafts extending between said pair of opposed longitudinal cross members, said support beams operably supported by said guide shafts for movement toward and away from one another on a continuum.

14. A clamp frame as set forth in claim 13 wherein said pair of opposed longitudinal cross members further include bearing members interconnecting said support beams and said guide shafts and which facilitate smooth linear motion of said support beams toward and away from one another.

15. A clamp frame as set forth in claim 13 wherein said lifting mechanism includes a plurality of slide guides supported on said main carriage and operatively connected to said guide shafts, a drive mechanism connected to said slide guides and operable to move said guides vertically relative to said main carriage thereby moving said support beams and their associated clamping members toward and away from said common plane.

16. A clamp frame as set forth in claim 15 wherein each of said slide guides includes a plate having a pair of slots disposed spaced from one another and offset in the direction of movement of said slide guides relative to said main carriage, each of said slots adapted to slidably receive a headed fastener mounted to said main carriage so as to facilitate smooth vertical movement of said slide guides relative to said main carriage.

17. A clamp frame as set forth in claim 16 wherein each of said slide guides further include a boss mounted to said plate, said boss including an aperture through which said guide shafts pass and are supported as said pair of opposed longitudinal cross members are moved relative to said common plane.

18. A clamp frame as set forth in claim 17 wherein said drive mechanism includes a drive shaft and a linkage interconnecting said drive shaft and each of said plates, said drive shaft acting to selectively raise and lower said pair of opposed longitudinal cross members relative to said main carriage through said linkage and said slide guides.

19. A clamp frame as set forth in claim 18 wherein said linkage further includes arms fixed to said drive shaft, a clevis fixed to each of said plates and a link extending between each of said arms and each of said plates of translating rotational movement of said drive shaft into smooth linear movement of said plate as said pair of opposed longitudinal cross members are raised and lowered relative to said main carriage.

20. A clamp frame as set forth in claim 4 wherein said clamp members on said pair of opposed transverse cross members include a clamp having a lower clamp extrusion, an upper clamp extrusion, and an actuator operatively connected to said upper clamp extrusion, said upper clamp extrusion being movable relative to said lower clamp extrusion under the influence of said actuator between open and closed positions to secure and release the edges of a work piece.

21. A clamp frame as set forth in claim 20 wherein said actuator includes a piston moveably supported in a cylinder, and a piston rod operatively interconnecting said piston and said upper clamp extrusion for moving said upper clamp extrusion relative to said lower clamp extrusion between its opened and closed positions.

22. A clamp frame as set forth in claim 5 wherein each of said pair of opposed transverse cross members is a tubular segment, said clamping members being mounted to said tubular segments.

23. A clamp frame as set forth in claim 22 further including a pair of lead screws extending transverse to said transverse cross members and through said tubular segments at both ends thereof, each of said tubular segments including a pair of nuts disposed at either end thereof and corresponding to said lead screws such that rotation of said lead screws causes selective movement of said tubular segments toward and away from each other.

24. A thermo-forming machine comprising:

a source of heat, a mold assembly and a clamp frame for securing a work piece in a predetermined orientation, said clamp frame being indexed to position the work piece opposite said source of heat thereby increasing the temperature of the work piece and to position the work piece relative to said mold assembly such that the shape of the work piece may be plastically altered by said mold assembly;

said clamp frame including a pair of opposed, transverse cross members each of which are infinitely adjustable along a continuum toward and away from one another, each transverse cross member including at least one clamping member for securing a work piece to said frame by clamping the respective edges thereof;

a pair of opposed, longitudinal cross members each of which are infinitely adjustable along a continuum toward and away from one another, each longitudinal cross member including at least one clamping member for securing a work piece to said frame by clamping the respective edges thereof;

said clamping members for each of said respective pair of opposed longitudinal cross members adapted to be disposed on a common plane when the workpiece is secured in said frame; and at least one of said pair of transverse and longitudinal cross members being movable such that the associated clamping members of the respective cross members are spaced from said common plane while the associated clamping members of the other respective cross members remain substantially in said common plane allowing for movement of said transverse and longitudinal cross members toward and away from one another along a full continuum defined by said clamp frame when the position of said cross members is adjusted.

25. A thermo-forming machine as set forth in claim 24 further including a lifting mechanism which is operable to move at least one of said pair of transverse and longitudinal cross members in a direction substantially perpendicular to said common plane such that the associated clamping members of the respective cross members are no longer disposed on said common plane.

26. A thermo-forming machine as set forth in claim 25 wherein said lifting mechanism is operable to move said longitudinal cross members in a direction perpendicular to and spaced from said common plane.

27. A thermo-forming machine as set forth in claim 25 further including a main carriage which supports said pair of opposed transverse and longitudinal cross members for movement independent of one another.

28. A thermo-forming machine as set forth in claim 27 wherein each of said pair of opposed, longitudinal cross members includes a support beam and at least one clamping member moveably supported by said support beam on a continuum in the direction of said support beam.

29. A thermo-forming machine as set forth in claim 28 wherein said clamping members on each of said support beams includes a hanger moveably supported by said support beam on a continuum in the direction of said support beam and a clamp supported by said hanger.

30. A thermo-forming machine as set forth in claim 29 wherein each of said support beams includes an elongated slot extending for a substantial length of said cross member with an adjustable fastening mechanism cooperatively interconnecting said hangers and said support beams to allow selective movement of said clamps relative to said support beams in the direction of said elongated slot.

31. A thermo-forming machine as set forth in claim 29 further including a pair of opposed guide shafts extending between said pair of opposed longitudinal cross members, said support beams operably supported by said guide shafts for movement toward and away from one another on a continuum.

32. A thermo-forming machine as set forth in claim 31 wherein said pair of opposed longitudinal cross members further include bearing members interconnecting said support beams and said guide shafts and which facilitate smooth linear motion of said support beams toward and away from one another.

33. A thermo-forming machine as set forth in claim 31 wherein said lifting mechanism includes a plurality of slide guides supported on said main carriage and operatively connected to said guide shafts, a drive mechanism connected to said slide guides and operable to move said guides vertically relative to said main carriage thereby moving said support beams and their associated clamping members toward and away from said common plane.

34. A thermo-forming machine as set forth in claim 33 wherein each of said slide guides includes a plate having a pair of slots disposed spaced from one another and offset in the direction of movement of said slide guides relative to said main carriage, each of said slots adapted to slidably receive a headed fastener mounted to said main carriage so as to facilitate smooth vertical movement of said slide guides relative to said main carriage.

35. A thermo-forming machine as set forth in claim 34 wherein each of said slide guides further include a boss mounted to said plate, said boss including an aperture through which said guide shafts pass and are supported as said pair of opposed longitudinal cross members are moved relative to said common plane.

36. A thermo-forming machine as set forth in claim 35 wherein said drive mechanism includes a drive shaft and a linkage interconnecting said drive shaft and each of said plates, said drive shaft acting to selectively raise and lower said pair of opposed longitudinal cross members relative to said main carriage through said linkage and said slide guides.

37. A thermo-forming machine as set forth in claim 28 wherein each of said pair of opposed transverse cross members is a tubular segment, said clamping members being mounted to said tubular segments.

38. A thermo-forming machine as set forth in claim 37 further including a pair of lead screws extending transverse to said transverse cross members and through said tubular segments at both ends thereof, each of said tubular segments including a pair of nuts disposed at either end thereof and corresponding to said lead screws such that rotation of said lead screws causes selective movement of said tubular segments toward and away from each other.

\* \* \* \* \*